Aug. 16, 1932.  B. T. ANDREN  1,872,616
CONNECTING METAL PLATE
Filed April 10, 1930
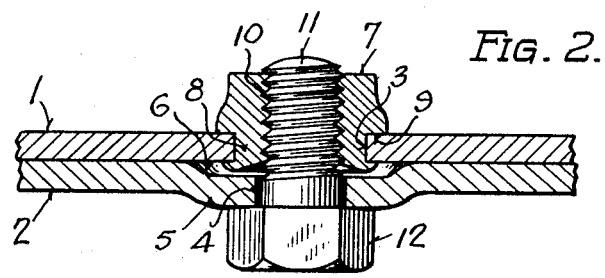
INVENTOR.
Birger T. Andren
BY
*Elvin A. Andrus*
ATTORNEY.

Patented Aug. 16, 1932

1,872,616

UNITED STATES PATENT OFFICE

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK

CONNECTING METAL PLATE

Application filed April 10, 1930. Serial No. 443,068.

This invention relates to connecting metal plates and relates particularly to a specific modification and improvement upon the invention set forth in Letters Patent No. 1,705,463, issued March 12, 1929.

The patent above referred to specifically illustrates a nut attached to an embossed metal plate, the embossment being for the purpose of providing a resilient mounting for the nut to prevent loosening of the parts when the plate is bolted to another metal part, and also for the purpose of providing a recess to receive the extended shank of the nut.

The present invention is a specific modification of the illustration of the patent and may be more readily understood by reference to the accompanying drawing in which the views are as follows:

Figure 1 is a perspective view illustrating the parts ready for assembly, the nut and bolt being shown removed from the parts.

Fig. 2 is a sectional view through the joint showing the final assembly relation of the parts.

Fig. 3 is a view similar to Fig. 2 showing a modified form of connection.

In carrying out the invention, where two flat plates 1 and 2 are to be joined by means of a bolt, the plates are first perforated to form holes 3 and 4, respectively, therethrough. The metal adjacent the hole 4 in plate 2 is then displaced to form an embossment 5 on the under side of the plate and a recess 6 on the upper side of the plate. The perforation 3 in plate 1 is preferably of non-circular cross-section, that illustrated in the drawing being hexagonal.

A nut 7 is then formed having a shank or projection 8 at one end and a flat shoulder 9 at the base of the projection. The nut has a threaded opening 10 extending therethrough and the end of the shank 8 is recessed as illustrated in the drawing, Fig. 2. The shank 8 of the nut is preferably of non-circular cross-section, that shown in the drawing being hexagonal and complementary to the perforation 3 in plate 1. The nut is then applied to plate 1 with the shank 8 extending through the perforation 3 and the metal at the end of the shank is deformed to rivet or otherwise secure the nut to the plate 1.

The plates 1 and 2 are then assembled with the threaded opening 10 in the nut aligned with the opening 4 in plate 2 and a bolt 11 is passed through the parts with its head 12 in engagement with the embossment 5 in plate 2 and with its threaded portion in engagement with the nut 7. The nut is prevented from turning by means of its shank 8 which fits in the non-circular perforation 3 in plate 1.

The bolt is screwed into the nut until the embossment 5 is compressed and placed under stress. The yielding of the embossment provides a resilient pressure against the bolt head and prevents turning or loosening of the bolt. The recess 6 in plate 2 receives the deformed end of the shank 8 of the nut, and thereby allows the plates to be assembled in contact with each other.

The modification shown in Fig. 3 illustrates a method of obtaining the objects of the invention without employing an embossment on the plate 2, the plate 2 being counter-sunk to provide a recess similar to that formed by providing the embossment shown in the Figs. 1 and 2. The thinning of the plate at the perforation in the plate 2 provides a resilient connection for the parts and at the same time provides a recess for receiving the end of the shank of the nut.

I claim:

1. The method of attaching metal parts which comprises the operations of perforating a plate and displacing the metal about the perforation to form a recess on one side of the plate, applying a perforated part to the recessed side of the plate with the perforations aligned, applying a nut to said perforated part and passing a threaded member through said recessed plate into engagement with said nut with the head of the threaded member engaging the recessed plate whereby when the threaded member is tightened the plate is yieldingly connected to the said part.

2. The method of attaching metal parts which comprises the operations of perforating a plate and displacing the metal about the perforations to form an embossment upon one side of the plate and a recess upon the other, perforating a part which is to be connected to said plate to form a non-circular opening therethrough, applying a nut to said perforated part with a shank of the nut extending through the non-circular opening therein, said shank being of non-circular shape complementary to said opening whereby the nut is prevented from turning in said part, deforming the metal at the end of the shank to secure the nut to the perforated part, assembling the part and plate with the recess in the plate receiving the deformed end of the shank of the nut and with the perforation in the plate aligned with the threaded opening in the nut, and passing a threaded member through the perforation in the plate and into engagement with the nut with the head of the member engaging the embossment in the plate whereby when the threaded member is tightened, the plate is yieldingly connected to the said part.

3. Connected metal parts comprising a perforated metal plate having the metal about the perforation displaced to form an embossment upon one side of the plate and a recess upon the other, a second perforated member arranged at the recessed side of the plate with the perforations aligned, combined with a threaded nut applied to said second perforated member, and a bolt passing through the perforation in said plate and into engagement with the nut, the head of the bolt being in engagement with the embossment in said plate whereby the parts are yieldingly connected together and the bolt and nut are placed under stress which prevent the same from relatively turning and loosening.

In witness whereof I have signed my name at Milwaukee, Wisconsin, this 8th day of April, 1930.

BIRGER TORVALD ANDREN.